United States Patent [19]

Patterson et al.

[11] Patent Number: 5,638,477
[45] Date of Patent: Jun. 10, 1997

[54] STRAIN RELIEF MEANS FOR OPTICAL FIBER SPLICING MEMBER AND IMPROVED TOOL FOR MAKING THE SPLICE

[75] Inventors: Richard A. Patterson, Georgetown; Gordon Wiegand, Austin, both of Tex.

[73] Assignee: Minnesota Mining and Manufacturing Company, St. Paul, Minn.

[21] Appl. No.: 587,771

[22] Filed: Dec. 22, 1995

[51] Int. Cl.⁶ .................................................. G02B 6/255
[52] U.S. Cl. ................................................................ 385/99
[58] Field of Search ........................... 385/88, 95, 99, 385/100, 147

[56] References Cited

U.S. PATENT DOCUMENTS

| | | | |
|---|---|---|---|
| 4,730,892 | 3/1988 | Anderson et al. | 350/96.21 |
| 4,753,529 | 6/1988 | Layton | 250/227.27 |
| 4,824,196 | 4/1989 | Bylander | 385/134 |
| 4,824,197 | 4/1989 | Patterson | 350/96.21 |
| 4,865,412 | 9/1989 | Patterson | 350/96.21 |
| 4,984,868 | 1/1991 | ten Berge | 350/96.21 |
| 4,986,625 | 1/1991 | Yamada et al. | 350/96.2 |
| 5,044,719 | 9/1991 | Nakamura | 385/76 |
| 5,048,920 | 9/1991 | Newell | 385/55 |
| 5,102,212 | 4/1992 | Patterson | 385/98 |
| 5,121,455 | 6/1992 | Palecek | 385/69 |
| 5,121,456 | 6/1992 | Essert et al. | 385/70 |
| 5,134,678 | 7/1992 | Essert | 385/86 |
| 5,189,717 | 2/1993 | Larson et al. | 385/95 |
| 5,323,480 | 6/1994 | Mullaney et al. | 385/135 |
| 5,452,386 | 9/1995 | van Woesik | 385/72 |
| 5,477,507 | 12/1995 | Kaplan | 174/73.1 |
| 5,515,472 | 5/1996 | Mullaney et al. | 385/135 |

*Primary Examiner*—Akm E. Ullah
*Attorney, Agent, or Firm*—Gary L. Griswold; Walter N. Kirn; Gerald F. Chernivec

[57] ABSTRACT

A splice member for splicing ends of optical fibers is provided with clips to restrict torsional stress from being applied to the ends of the cables held in the splice element. A tool is used to secure the splicing member onto the cables and it operates to sequentially actuate the splicing element to grip and align the fiber ends and actuates the clamps onto the fiber to restrict the torsional stress on the fiber ends.

7 Claims, 10 Drawing Sheets

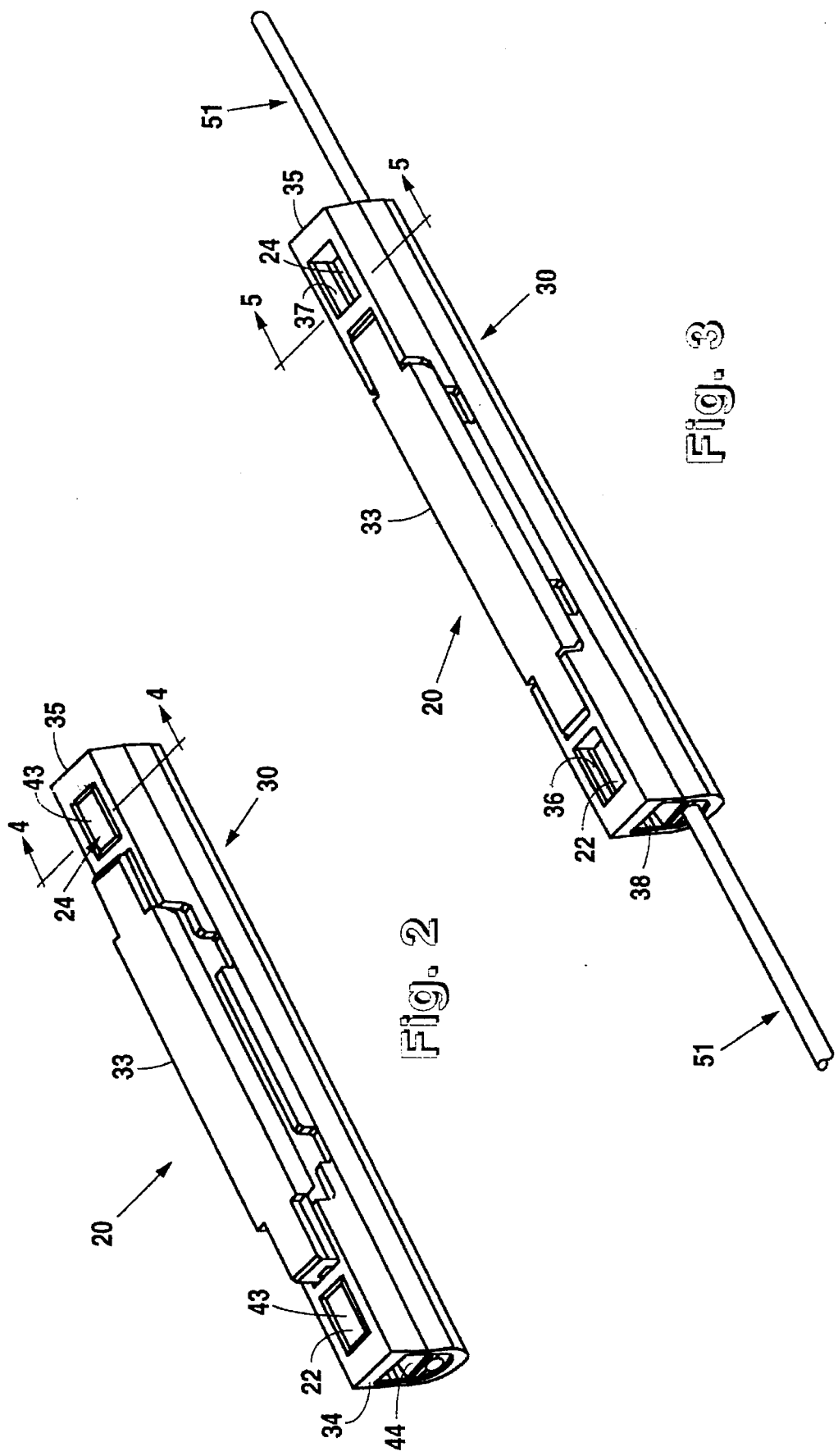

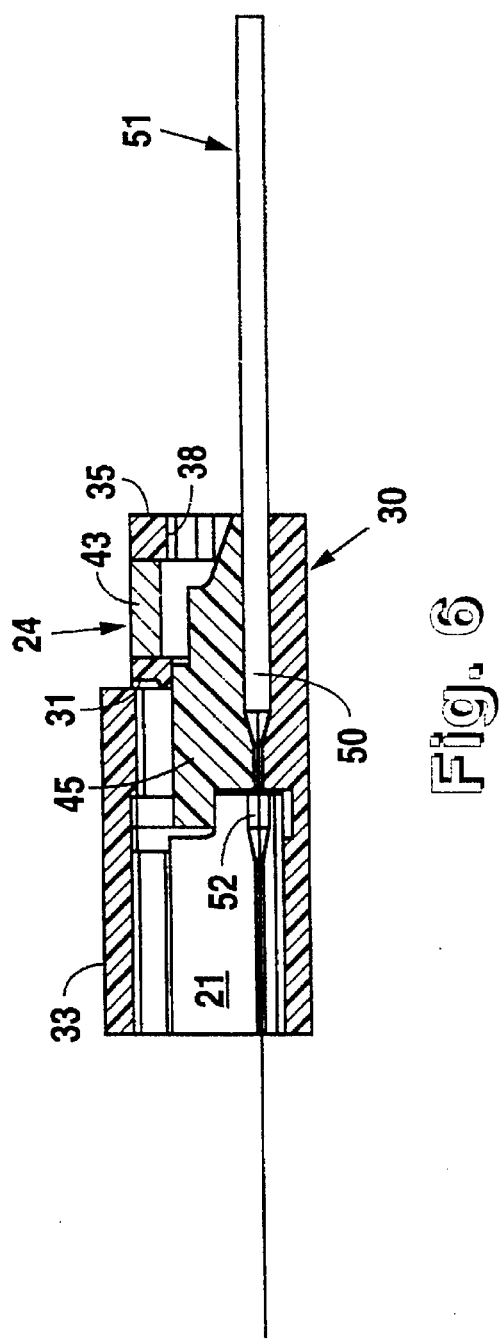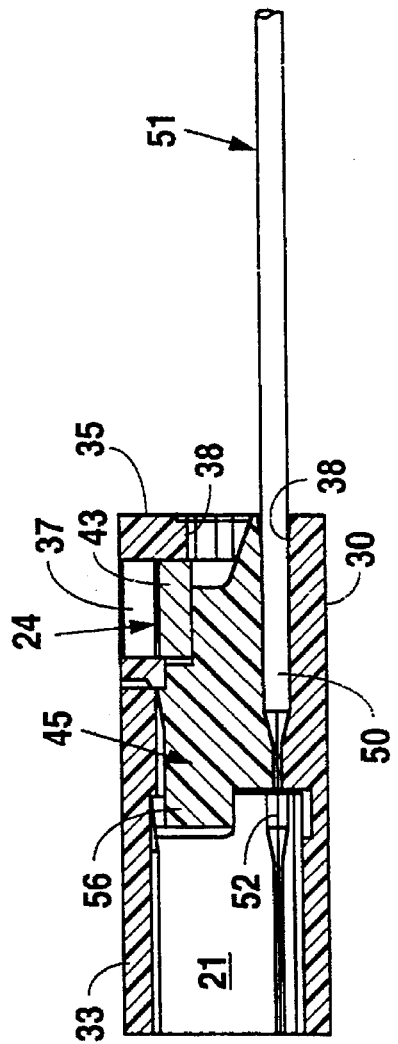

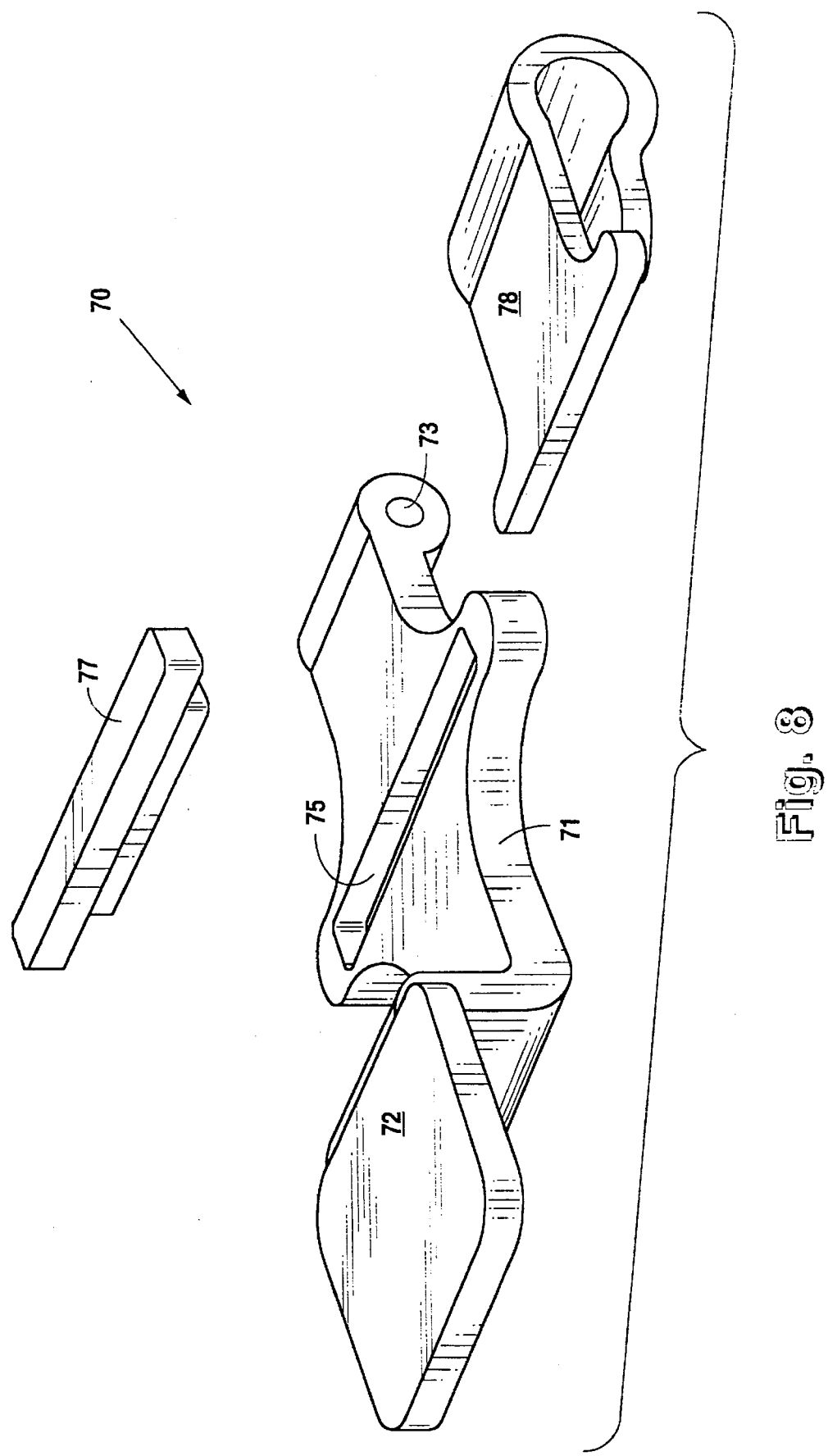

STRAIN RELIEF MEANS FOR OPTICAL FIBER SPLICING MEMBER AND IMPROVED TOOL FOR MAKING THE SPLICE

BACKGROUND OF THE INVENTION

1. Field of the Invention

This invention relates to an improvement in a splicing member for splicing optical fiber cables and in one aspect relates to a new splice element having a torsional strain relief member to engage the buffer or jacket of the optical fiber cables being spliced to restrict buffer rotation, maintain the buffer in the splicing member and to relieve torsional stress from being transferred to the core fiber and cladding, restricting fiber breakage induced by torsion, particularly in 900 um buffered fiber. A further aspect of the invention is an improvement in the splicing tool used to complete the splice.

2. Description of the Prior Art

The commercially available splice element as disclosed in U.S. Pat. Nos. 4,865,412; 4,824,197; 5,102,212 and 5,189,717, and available from the assignee of this invention, provides an effective member for splicing optical fiber cable in the field. When technicians make the splices however and then coil the slack lengths of fiber in a splicing tray, instances of fiber breakage have been reported. This breakage appeared to be occurring almost entirely when relatively long lengths of 900 um fiber were tightly coiled and stored in splicing trays after the splicing members were installed. The fiber broke on the bare glass section between where the fiber entered the clamping or splicing element and the end of the plastic buffer or jacket on the cable. After study of this breakage, it was discovered that this breakage was the result of torsional stress being generated in the slack cable by coiling the stiff buffer coated fiber in the splice tray. During the coiling process, the free end of the fiber being coiled rotates a fixed amount for each coil being made in the fiber. For example, if the fiber is coiled four (4) times in a tray to store the slack, then the free end of the fiber would attempt to rotate four revolutions to relieve the built up torsional stress. Since the fiber plastic buffer coating is torsionally rigid, and because the 900 um fiber usually cannot rotate within its cable, as occurs with loose buffered 250 um fiber, all the coiling induced torsional stress is focussed on the bare glass portion of the fiber where it enters the splice element of the splicing member. If most of the fiber is coiled in storage before the fiber ends are spliced the torsional stress is reduced. The use of a tool for the splicing operation however requires that a certain length of the fibers remain uncoiled. Therefore, a certain amount of stress will be present when splicing 900 um cables. Additionally, it has been noted that the plastic buffer coating on 900 um fiber shrinks back from where it has been stripped when the fiber is exposed to elevated temperatures. This characteristic varies with the type of buffer coating material and the manufacturer.

Strain relief members have been used in conjunction with the sleeves of optical fiber connectors. This is illustrated in such patents as U.S. Pat. Nos. 5,121,455 and 5,452,386. The U-shaped retention members 34 and 35, which are illustrated in U.S. Pat. No. 5,121,455, are narrow plate-like members having U-slots formed in the plates and are inserted through apertures in opposed relation to each other. The U-shaped slots have sharp, inner edges 38 on their legs to penetrate the outermost material portions of the optical fiber cable to retain the cable in firmly, longitudinally retained position within a rigid sleeve of the connector. This is an example of an axial strain relief member in a connector. In connectors, the sleeve is allowed to rotate. It can rotate in the connector or prior to being inserted into the connector. Thus, there is not a build up of torsional stress on the fiber end. A retention member in the connector plug would not negate torsional stress. Further, in U.S. Pat. No. 5,452,386, the fiber fixing clip 12 is stamped from a single piece of sheet metal stock and comprises a flat base 62 from opposite edges of which depend respective fiber retention plates 64, each of which comprise a pair of legs 66 each having a tapered free end portion 68, the legs defining between them an opening 67 having parallel side edges 65, which edges bite into the jacket J of a fiber inserted into the sleeve 8 of the connector. The narrow edges of the legs restrict the axial pull-out of the fiber from the sleeve, but there is no teaching of the clip restricting torsional stress on the stripped end of the fiber that is inserted into connector 102 and the sleeve 8, against the gel 206, and abutting the length of fiber fixed in the connector. Any relief of torsional stress is not needed nor does it appear to be contemplated by the patentee.

U.S. Pat. No. 5,048,920 also illustrates and clearly teaches the use of a clamp 78 to grasp a fiber end and fix the end within a fiber passage. The clamp 78 is not described as used to restrict torsional stress on the fiber end held in compression against the second fiber end. This again is a clear teaching of the use of a plate member having a U-shaped slot which engages the optical fiber end between the narrow opposed edges defining the U-shaped slot.

Additional prior art showing a splicing member is U.S. Pat. No. 4,730,892. This patent discloses a splicing device having a cover and a base housing members 10 and 12, first and second fibers 13 entering the housing member, a pair of clamps 14, 16 for clamping jacketed fiber within the device and a central screw-mounted bias member 18 for clamping stripped fiber ends at a junction zone. The clamps 14, 16 are formed with an elastomer block at the lower end to provide the desired gripping of a jacketed portion of each fiber. This patent is silent about clamping the jacketed fiber to avoid torsional stress on the portion of the glass between the clamp aligning the fiber ends and the elastomer block on the clamp.

SUMMARY OF THE INVENTION

The prior art fails to teach the use of a clip in a splicing member to restrict torsional stress on the joined fiber ends for the purpose of avoiding breakage of the fibers at the ends. Further, the use of a U-shaped clip comprising parallel plate members positioned on opposite sides of a fiber to compress, rather than cut or relocate the buffer, between narrow, opposed edges for restricting rotational stress on the stripped end of the fiber placed in a splice element, is simply not suggested.

The prior art fails to suggest the use of a single tool to first join the fiber ends in abutting relationship and then to clamp the fibers in the splicing member to restrict torsional stress by actuating the clips subsequent to the actuation of the fiber clamping and aligning element. The prior art also fails to suggest that a "U" clip can be used to prevent transfer of torsional stress and at the same time translate longitudinally to accommodate shrinkage or pullback of the fiber buffer at elevated temperatures.

The present invention affords a splicing member which is provided with torsional strain relief to restrict damage to the bare glass section in the area between where the fiber entered the clamping and aligning element and the end of the plastic buffer. Further, the present invention provides relief for the stress caused on the bare glass by the shrinkage of the plastic buffer coating or jacket when the fiber is exposed to elevated temperatures.

The present invention is directed to an optical fiber splicing member for splicing two ends of optical fiber cables, each having a central optical fiber core covered by cladding, and a buffer or jacket surrounding the cladding. The splicing member comprises in combination a splicing element for receiving the ends of the fibers and placing them in abutting, aligned coaxial relationship and clamping means for clamping the fibers and fixing the jacket in relationship to the splicing element to restrict torsional stress upon fiber ends in the splicing element.

The optical fiber splice of the present invention provides for the splicing of two ends of a pair of optical fiber cables, each having a central optical fiber core covered by cladding, and a plastic buffer or jacket outside of the cladding. The splicing member comprises a splice element having first and second generally planar leg members, said first and second leg members having a plurality of angularly related surfaces defining an optical fiber receiving passageway for receiving and precisely registering abutting ends of optical fibers coaxially when said leg members are forced together against the fiber ends, a base having a slotted opening for supporting the splice element, a cap fitting into said slotted opening for squeezing the splice element about the ends of a pair of abutting ends of the cables. The base has ends, each formed with a cable receiving opening defining a path for receiving a cable end and guiding the cable end into the splice element. Means defining slots communicating with the cable receiving openings are formed to communicate with and cross opposite sides of each cable path. Clip members are received in the slots and are movable across the path of the cable receiving openings for engaging the buffer or jacket of the cables and securing the buffer or jacket of the cables to restrict rotation of the buffer or jacket in relationship to the splice element. The clips are formed of parallel plates having opposed grooves to allow insertion of the cables into the splicing element, but when they are moved across the path of the cables, they tightly engage the buffer or jacket and deform the same to form intimate contact with deformed flattened surfaces resulting on the buffer coating or jacket.

The optical fiber splicing member has cable receiving openings in the base to receive an insert supporting the clips. The inserts are formed with a cable receiving opening defining a path for receiving a cable end and guiding the optical fiber into the splice element. The insert is inserted into the end of the base and has a leg extending into the slotted opening for receiving the splice element and the cap. The leg performs the function of retaining the splice element in the base.

Further, the present invention includes an improved tool for easily making the splice with the splicing member referred to above. The tool comprises a base having means for supporting fiber cable ends, a support for receiving a splicing member, and an actuating lever or handle formed with a first engaging member to engage the cap of the splicing member to close the cap onto the splicing element forcing its legs to grip the fiber ends and then, against the bias of a spring member, drive the clips into position onto the jacketed cable to deform the jacket and grip the cable sufficiently to restrict torsional stress on the cable outside the splicing member from reaching the fiber ends in the splicing element.

BRIEF DESCRIPTION OF THE DRAWINGS

The present invention will be further described with reference to the accompanying drawing wherein:

FIG. 2 is a perspective view of the assembled splicing member;

FIG. 3 is a perspective view of a splicing member actuated to splice two optical fiber cables;

FIG. 6 is a fragmentary vertical sectional view of the splicing member as illustrated in FIG. 2 receiving a cable at the end illustrated;

FIG. 7 is a fragmentary vertical sectional view of an end of the splicing element as illustrated in FIG. 3, with the cap and clips actuated to secure the fiber;

FIG. 8 is an exploded perspective view of a lever adapted for mounting on a base, which lever serves as a handle for the tool used to actuate the splicing member of the present invention:

DESCRIPTION OF THE PREFERRED EMBODIMENT

The present invention provides an improved splicing member and tool for operating the new member. It has been discovered that the splicing of fiber ends, stripped of the buffer coating or jacket, has resulted in breakage of the fiber ends if the joined cables are then coiled to place slack fiber of the joined cables in a tray or storage element. The splicing member of the present invention restricts the torsional stress built up in the cables from being transmitted to the spliced ends and restricts fiber breakage or crazing, and at the same time compensates for temperature induced pullback of the fiber buffer coating.

Figure 1:
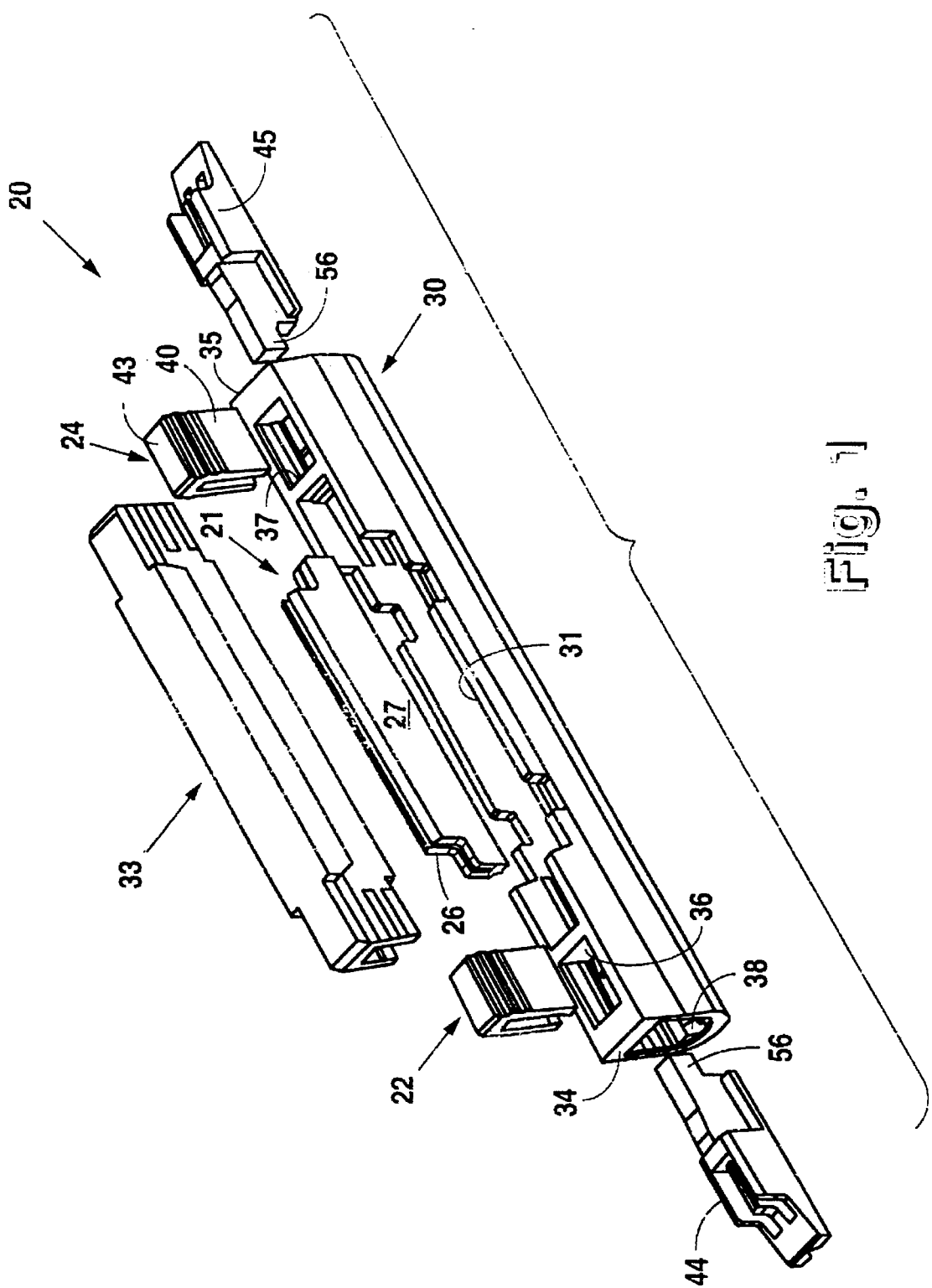
FIG. 1 is an exploded perspective view of the splicing member of the present invention.

The invention will be described in detail with reference to the accompanying drawing, wherein like reference numerals refer to like parts throughout the several views, and FIG. 1 shows an optical fiber splicing member 20 for splicing two ends of optical fiber cables. The splicing member 20 comprises in combination a hinged splicing element 21 for receiving the ends of the fibers and placing them in abutting, aligned coaxial relationship and clamping means in the form of clip members 22 and 24 for clamping the fibers inserted into the splicing element 21 to restrict torsional stress upon fiber ends inserted into the splicing element 21.

Figure 5:
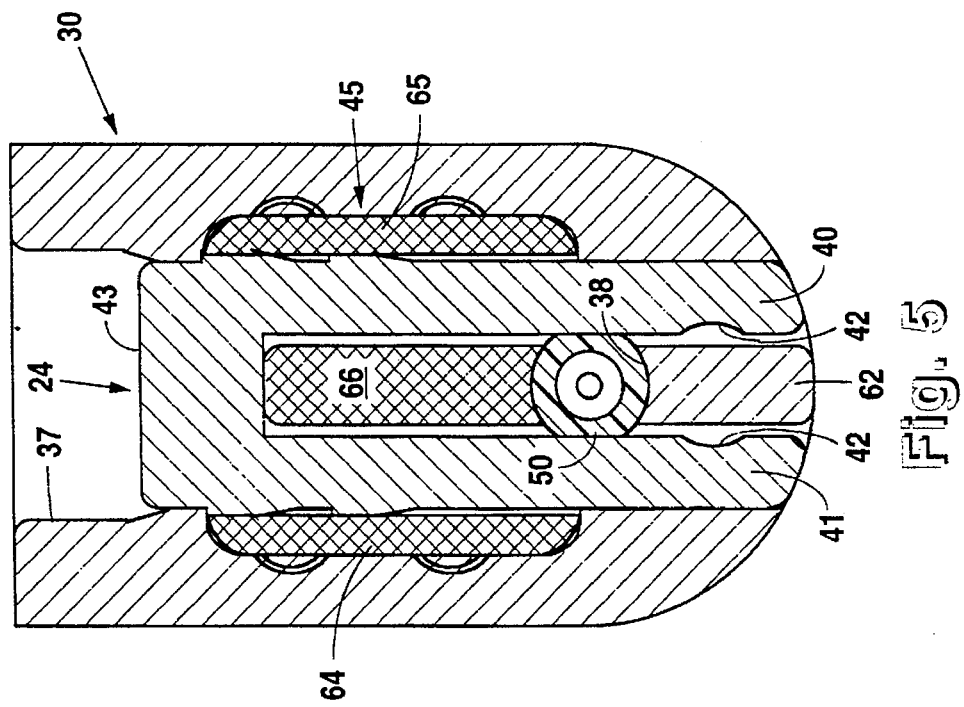
FIG. 5 is a cross-sectional view of the splicing element taken across line 5—5 of FIG. 3 showing the clips in actuated position about a cable.

The optical fiber splicing element 21 comprises an element having first and second generally planar leg members 26 and 27, having a plurality of angularly related surfaces defining an optical fiber receiving passageway for receiving and precisely registering abutting ends of optical fibers coaxially when the leg members are forced together against the fiber ends.. A base 30 has a slotted opening 31 for supporting the splice element 21. A cap 33 fits, from a raised position, into the slotted opening for squeezing the leg members 26 and 27 of the splicing element 21 about the abutting ends of a pair of cables. The base 30 has ends 34, 35, each formed with a cable receiving opening 38 defining a path for receiving a cable end and guiding the cable end into the splicing element 21. Apertures 36 and 37, adjacent the ends 34, 35 define slot means communicating with the cable receiving openings and are formed to communicate with and cross opposite sides of each cable path. Clip members 22, 24 are received in the slots 36 and 37 and are movable across the path of the cable receiving openings for engaging the buffer or jacket of the cables and deforming the buffer Coating for securing the buffer or jacket of the cables to restrict rotation of the buffer or jacket in relationship to the splicing element 21 and splice member 20. The clip members 22 and 24 are formed of parallel plates 40, 41, see FIG. 4, having opposed grooves 42 which form part of the path for the cable, allowing insertion of the cables into the base and the extended stripped ends into the splicing element 21. When the clip members 22 and 24 are moved across the path of the cables, they deform and tightly engage opposite sides of the buffer or jacket to afford intimate contact with the opposite flattened surfaces of the buffer coating or jacket, as illustrated in FIG. 5. The optical fiber splicing member 20 has cable receiving openings 38 in the ends, and in the illustrated example, the openings 38 form part of the cable path or passageway in the ends 34, 35 of the base 30. The openings 38, as illustrated, are large enough to receive an optical fiber support member, illustrated as inserts 44, 45, respectively, each of which are formed with a cable receiving channel or opening 46 and slots 47 to receive and support clip members 22 and 24, see FIGS. 4, 6 and 7. The cable receiving channel 46 cooperates with the base 30 to define a path for receiving and supporting the cable end 50 of a cable 51 and guiding the optical fiber 52, stripped of the jacket, into the splice element 21. Each insert 44, 45 has a leg 56 extending into the slotted opening 31, for receiving the splice element 21 and the cap 33, and the leg 56 performs the function of retaining the splice element 21 in the base 30.

The inserts 44, 45 are each formed with slotted openings therein which receive the clip members 22, 24 which communicate with the cable passageway therein. These inserts 44, 45 could be formed to support the clip members 22, 24 independent of the base 30 of the splice member 20. The slots are longer than the clip members so that the clips can translate in the Slots. The inserts with the mounted cable ends, held by the clip members against rotational movement in relationship to the inserts, could then be inserted into a base and into a splice element. Alternatively, the holding member for the cable end and the clip members, could be other than an insert, such as an attachment mounted on the base external thereto as opposed to being inserted in the end, to form a premounted member for the cable end prior to the splicing.

Figure 4:
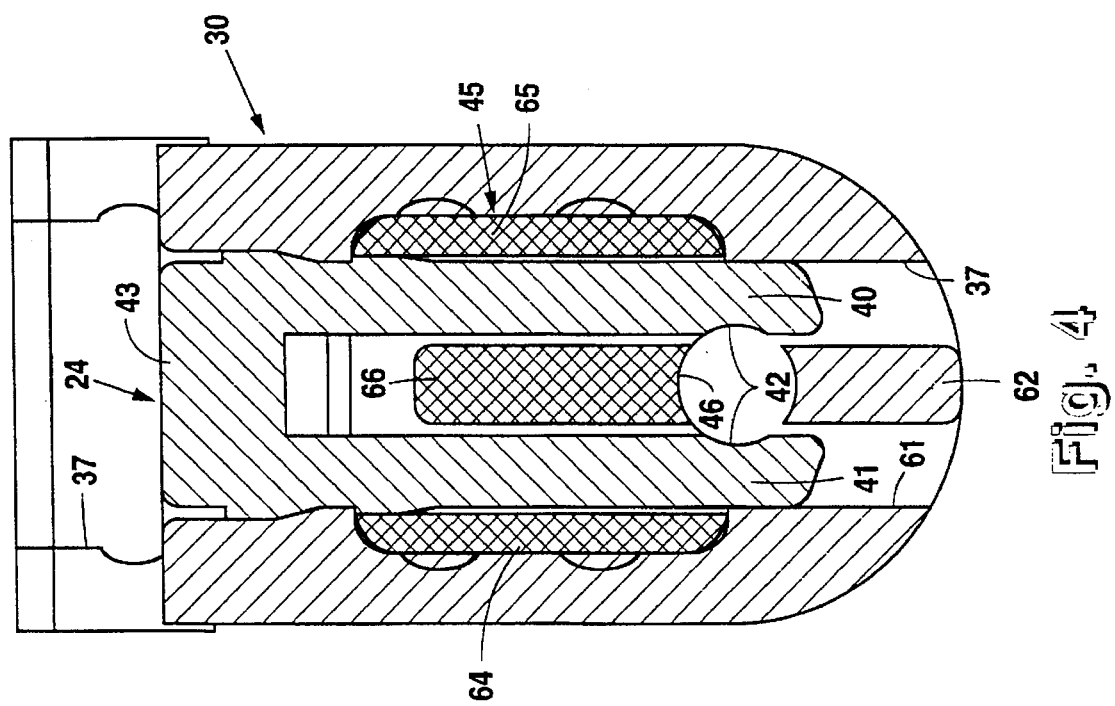
FIG. 4 is a cross-sectional view of the splicing element taken across line 4—4 of FIG. 2.
Figure 9:
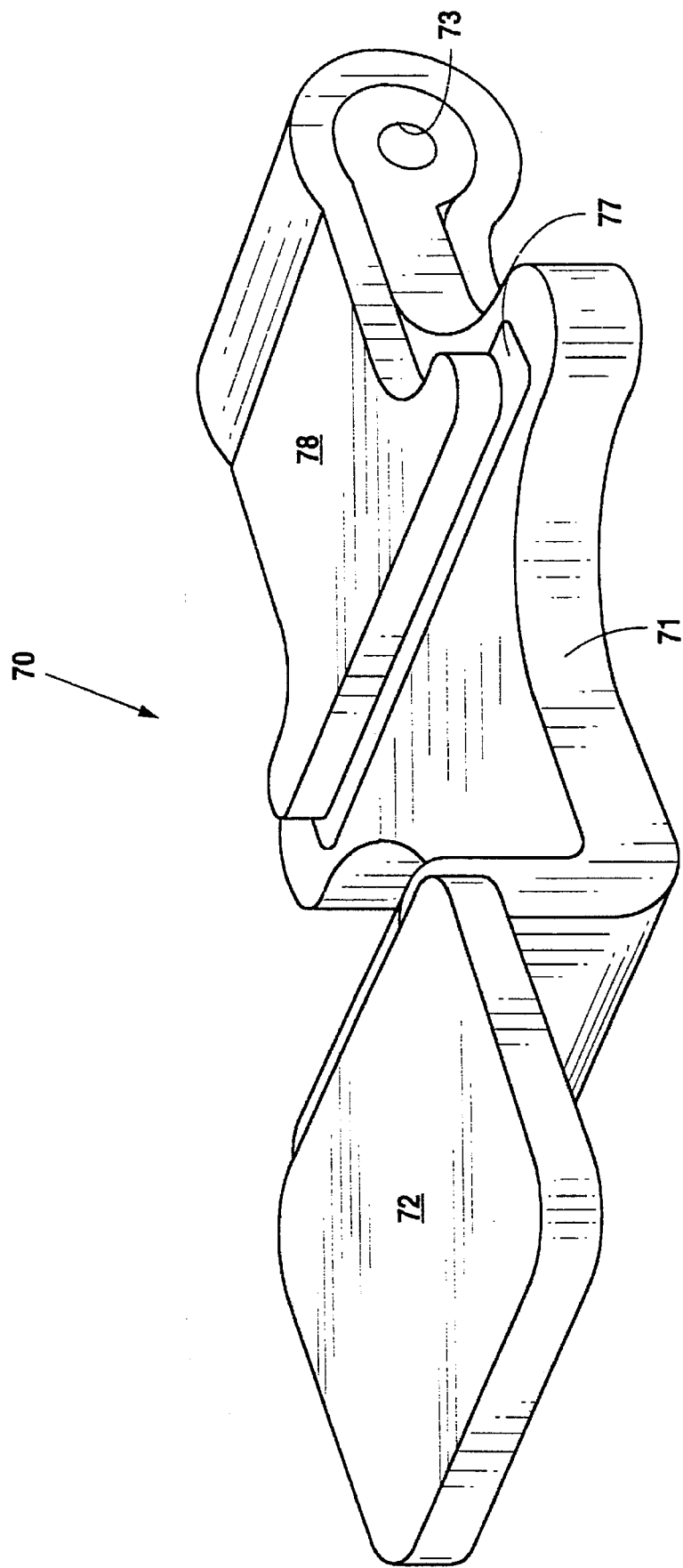
FIG. 9 is a perspective view of the handle of FIG. 8 in the assembled relationship.
Figure 10:
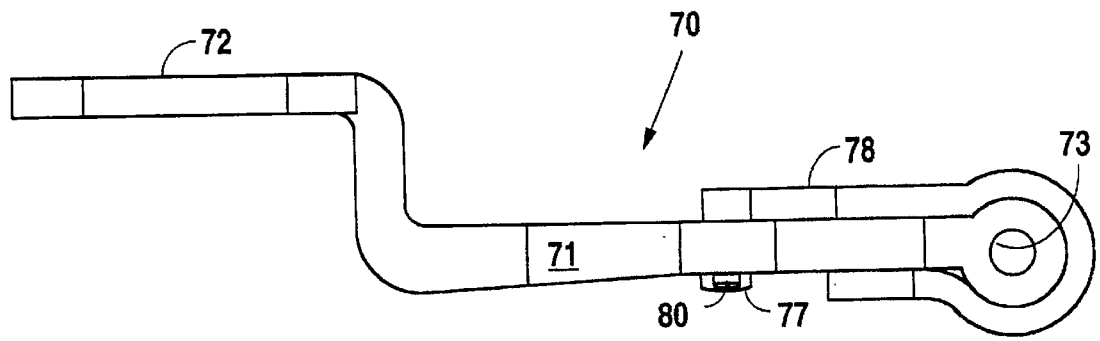
FIG. 10 is a side elevational view of the handle of the tool for actuating the splicing member.
Figure 11:
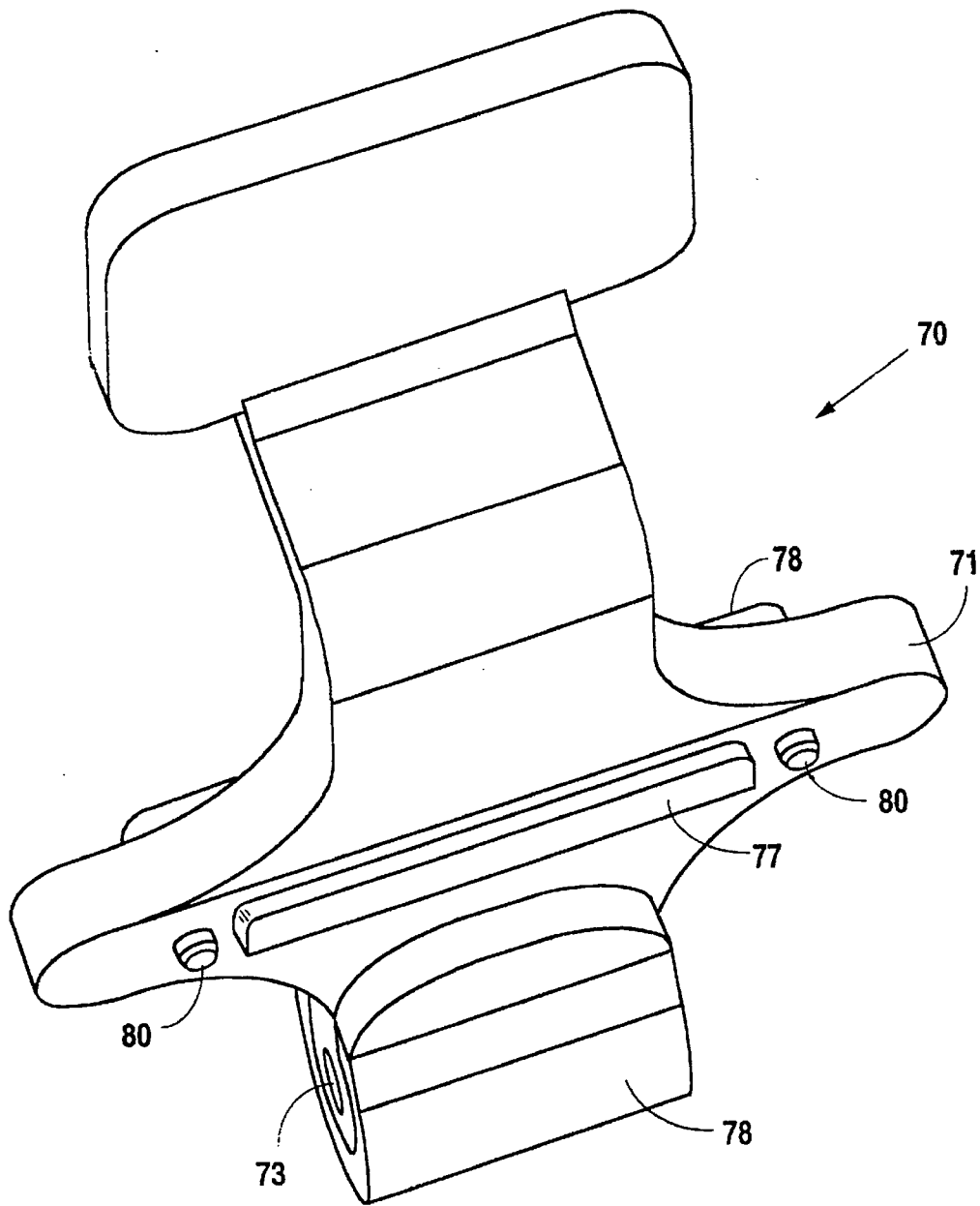
FIG. 11 is a perspective view of the bottom and left side of an assembled handle showing the actuating members for the cap and clips of the splicing member.

The clip members 22, 24 are generally U-shaped and are formed of a liquid crystal polymer. The base of the splice member 20 is formed of a liquid crystal polymer. Thus, there is no cold flow of the materials to loosen the grip on the jacket of the cable end 50. The clips each have plates 40, 41 positioned generally parallel and adapted to engage opposite sides of the cable end 50 and to displace some of the jacket on the cable end, and a cross member 43 joining adjacent parallel edges of the parallel plates 41, 40. When the clip members 22, 24 are actuated to grasp the cable ends 50, the free ends of the plates 40, 41, opposite the member 43, engage the walls of the means 37 forming the opening and, as part of said opening, parallel slots 61, 62 in the lower portion of the base 30, as best seen in FIG. 4, receive the free ends of the plates 40, 41 such that the free ends of the plates 40, 41 are not allowed to separate, and also, the inserts 44, 45 are formed with slots 47 defined between side walls 64, 65, and center walls 66. The slots 47 in the inserts also support the clip members 22, 24 but they also have recesses into which fit tapered projections on the clip members to afford a locking engagement of the clip members into the inserts, prior to actuation from the position shown in FIG. 4 to the position shown in FIG. 5, and to lock the clips in their down, actuated position after actuation.

The openings 36, 37 and slots 61, 62 can have an axial dimension greater than the length of the plates 40, 41 forming the clips 22, 24, and if the inserts are not allowed to float, the slots 47 formed between the side walls 64,65 and center walls 66 of the inserts have an axial dimension greater than the axial dimensions of the plates 40, such that the clips can move axially in the openings 36, 37, and slots 61, 62, and the parallel clip member receiving slots 47 in the inserts 44, 45, such that when the splice is subjected to temperature changes, causing an elongation of the cable end 52, the clip members 22, 24 will move axially. This movement avoids a bending of the fiber due to expansion of the fiber at elevated temperatures.

One advantage of the foregoing design is the ability of the clip members to accommodate axial movement of the fiber coating as it shrinks back along the fiber cable when it is subjected to elevated temperatures. If the glass is clamped in the element and the buffer is also clamped in the same structure, the fiber will move to an axially compressed condition resulting in macrobending which induces losses in the cable. The present invention avoids this phenomenon.

The cable receiving passageway in the ends 34, 35 formed by the base 30 and inserts 44, 45 allow the jacketed end of the cables to reach past the slotted openings 36 and 37. The cable ends are then cut, beyond the end of the jacket, to place the cable ends in abutting engagement generally midway in the passageway in the splicing element 21. The splicing element 21 is constructed according to the teachings of U.S. Pat. Nos. 4,865,412; 4,824,197; 5,102,212 and 5,189,717.

The splicing member of the present invention is adapted for use by the technician in the field. To aid the technician however, an improved tool has been designed for easily making the splice with the splicing member 20 referred to above. The tool comprises a base 68, see FIG. 12 having means 69 for supporting fiber cable ends, a support for receiving a splicing member, and a lever or handle 70 pivotally mounted to the base. The handle 70 is formed with a frame 71 having a pressure pad area 72 at one end and with a bore 73 forming a pivot axis at the other end. The frame 71 is formed with a slotted aperture 75, T-shaped in transverse and longitudinal section, for receiving a first anvil or engaging member 77 to engage the cap 33 of the splicing member 20 to close the cap 33 onto the splicing element 21 forcing its legs to grip the fiber ends. The anvil 77 is retained in position in the aperture 75 by a bias spring, illustrated as a leaf spring 78. The spring 78 wraps about the end of the frame 71 having the pivot axis and one end rests over the anvil 77 urging it through the opening 75. Looking at the opposite surface of the frame 71, there are two projections or studs 80 positioned adjacent opposite ends of the opening 75. The projections 80 are positioned to engage the cross members 43 of the clips to drive the clips 22, 24 into the base 30, subsequent to the anvil 77 pressing the cap 33 into the opening 31, against the bias of the spring member 78 to deform the jacket and grip the cable end 50 sufficiently to restrict torsional stress on the cable 51 from reaching the fiber ends 52 in the splicing element 21.

Figure 12:
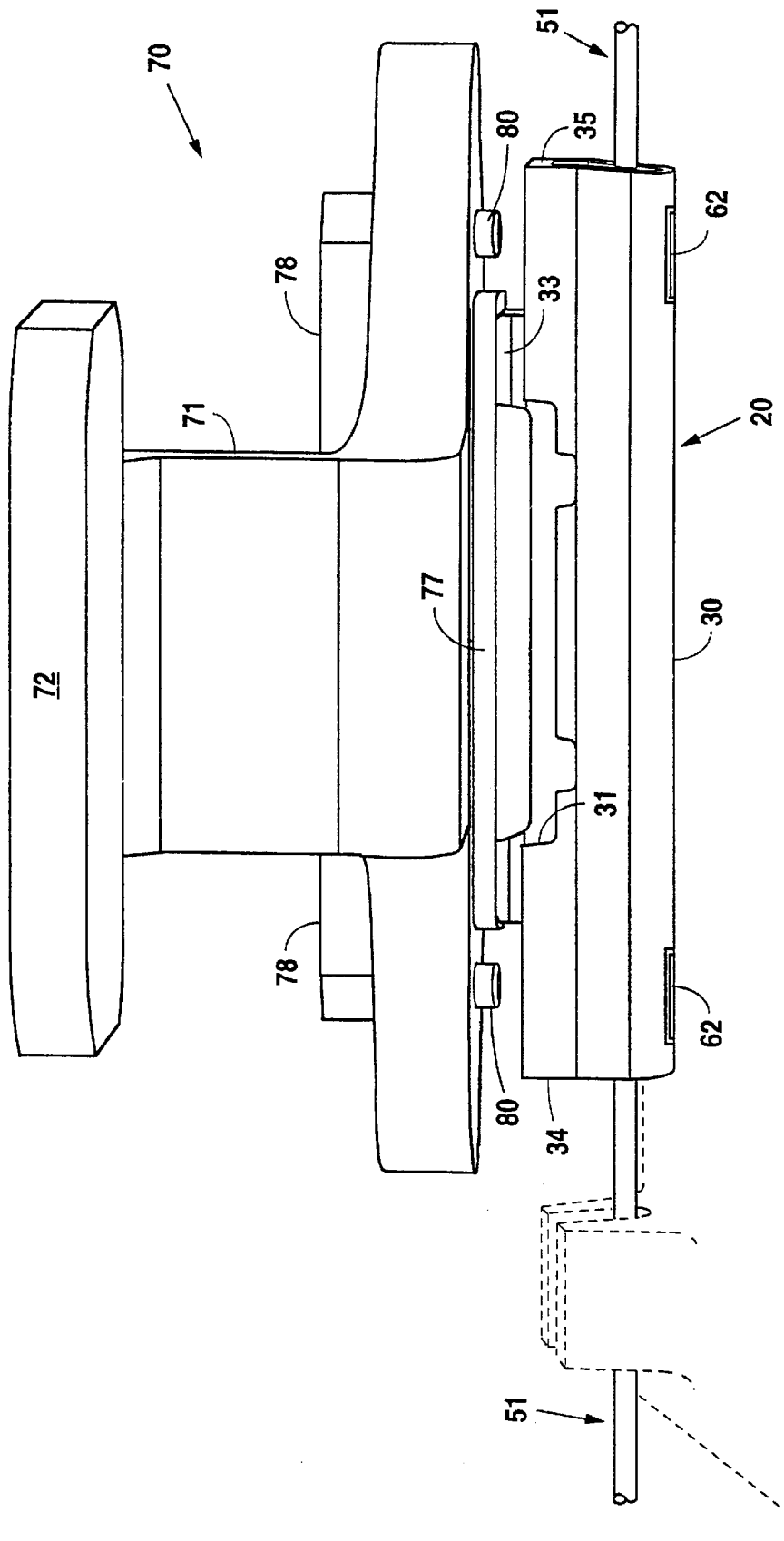
FIG. 12 is a front perspective view of the handle resting on the top of a splicing member of the present invention, where the splicing member would be supported on the base of the tool.
Figure 13:
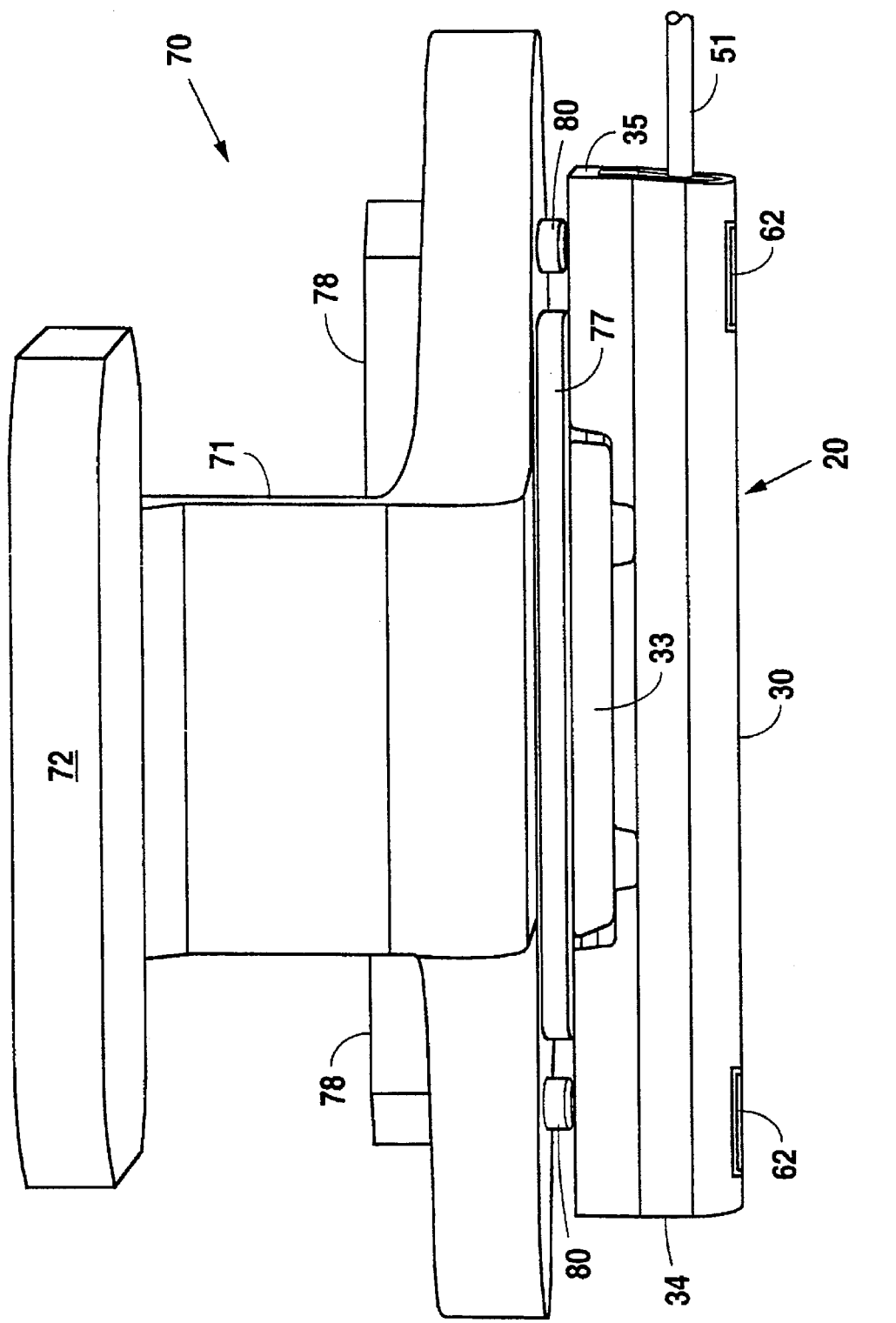
FIG. 13 is front elevational view slightly in perspective, as in FIG. 12, showing the handle actuating the cap to force the splicing element against the cable ends in the splicing element.
Figure 14:
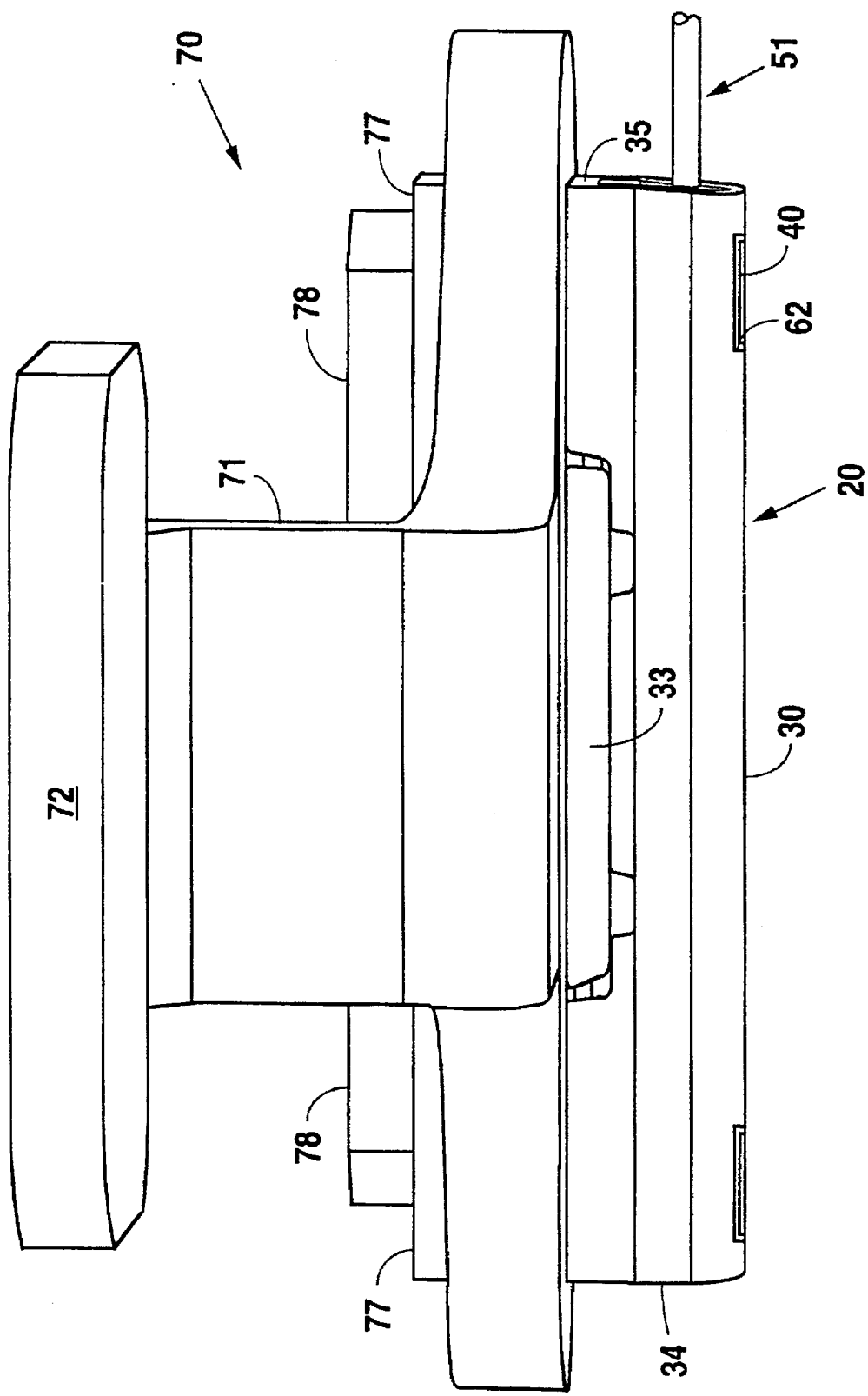
FIG. 14 is a front perspective view similar to FIGS. 12 and 13, showing the handle depressed against the bias of the spring to actuate the clips to clamp the jacketed ends of the cables, completing the actuation of the splicing element onto the cable ends.

An actuation sequence is illustrated in FIGS. 12, 13 and 14, wherein the handle is pivoted to rest on the splicing member 20 as shown in FIG. 12, with the anvil 77 resting on the top of the cap 33. The studs 80 are free from contact with the clip members. Then pressure is applied against the pressure pad 72 of the handle 70 and the anvil forces the cap 33 into position, as seen in FIG. 13. The spring 78 is sufficiently strong to allow the anvil 77 to drive the cap 33 to its seated position placing a clamping force on the legs 26, 27 of the splicing element 21. Then upon the application of continued pressure against the pad 72, the spring member 78 is flexed, and studs 80 engage the clips 22 and 24, forcing the same into the openings 36, 37 respectively, see FIGS. 5, 7, and 14, where the clip members 22 and 24 distort the jacket of the cable ends and firmly hold the jacket against rotational movement in relationship to the inserts, splicing member 21 and the base 30.

This particular tool is designed to perform the sequence described. There is nothing restricting the use of other designs such that the splice member 20 could be mounted on the end of a single cable by inserting the cable end into the insert from one end of the base 30 and actuating one clip member to retain the splice member 20 on that cable, and not actuate the splicing element 21 until it is desired to finish the splice with a second cable. Further, the clip members 22, 24 could be actuated prior to the actuation of the cap 33 or simultaneously with the cap 30 to complete the splice.

Having thus described the invention, and several obvious modifications, it is to be appreciated that further changes or modifications may be made, and that such modifications are contemplated and do not depart from the spirit of the invention as defined in the appended claims.

I claim:

1. An optical fiber splicing member for splicing two ends of optical fiber cables, each having a central optical fiber core covered by cladding, and a buffer or jacket outside of the cladding, said splicing member comprising a splice element having first and second generally planar leg members, said first and second leg members having a plurality of angularly related surfaces defining an optic fiber receiving passageway for receiving and precisely registering abutting ends of optical fibers when said leg members are squeezed together, a base having a slotted opening for supporting said splice element, a cap fitting into said slotted opening for squeezing said splice element about the abutting ends of a pair of a pair of said cables with sufficient force to grip the cable ends and to register the ends in coaxial alignment, said base having ends, each formed with a cable receiving opening defining a path for receiving a cable end and guiding the cable end into said splice element, and means defining slots communicating with said cable receiving openings, and U-shaped clip members received in said slots and movable across the path of said cable receiving openings for engaging the buffer or jacket of the cable and securing the buffer or jacket of said cables to restrict torsional force upon the cable end.

2. An optical fiber splicing member according to claim 1, wherein said cable receiving openings in said base receive an insert formed with a cable receiving opening defining said path for receiving a cable end and guiding the optical fiber into said splice element.

3. An optical fiber splicing member according to claim 2, wherein said inserts have a leg extending into the opening for receiving said splice element and said cap for retaining said splice element in said base.

4. An optical fiber splicing member according to claim 2, wherein said inserts have a through opening defining said cable receiving opening and path for the cable end, and said means defining slots communicating with said cable receiving openings are positioned parallel to and on opposite sides of said path and include opposed wall members and a central wall therebetween and are positioned on radially opposite sides of said cable receiving opening.

5. An optical fiber splicing member according to claim 1, wherein said clip members comprise U-shaped clips having a pair of generally parallelly positioned plates adapted to engage opposite sides of the cable and to displace some of said jacket on the cable, and a cross member joining adjacent parallel edges of said parallel plates.

6. An optical fiber splicing member according to claim 1, wherein said clamping means are allowed to move axially with a said optical fiber when the optical fiber is subjected to elevated temperatures and its buffer coating shrinks back along the fiber cable.

7. An optical fiber splicing member according to claim 1, wherein said clip members are allowed to move axially, in said slots communicating with said cable receiving openings, with a said optical fiber when the cable is subjected to elevated temperatures.

* * * * *